UNITED STATES PATENT OFFICE.

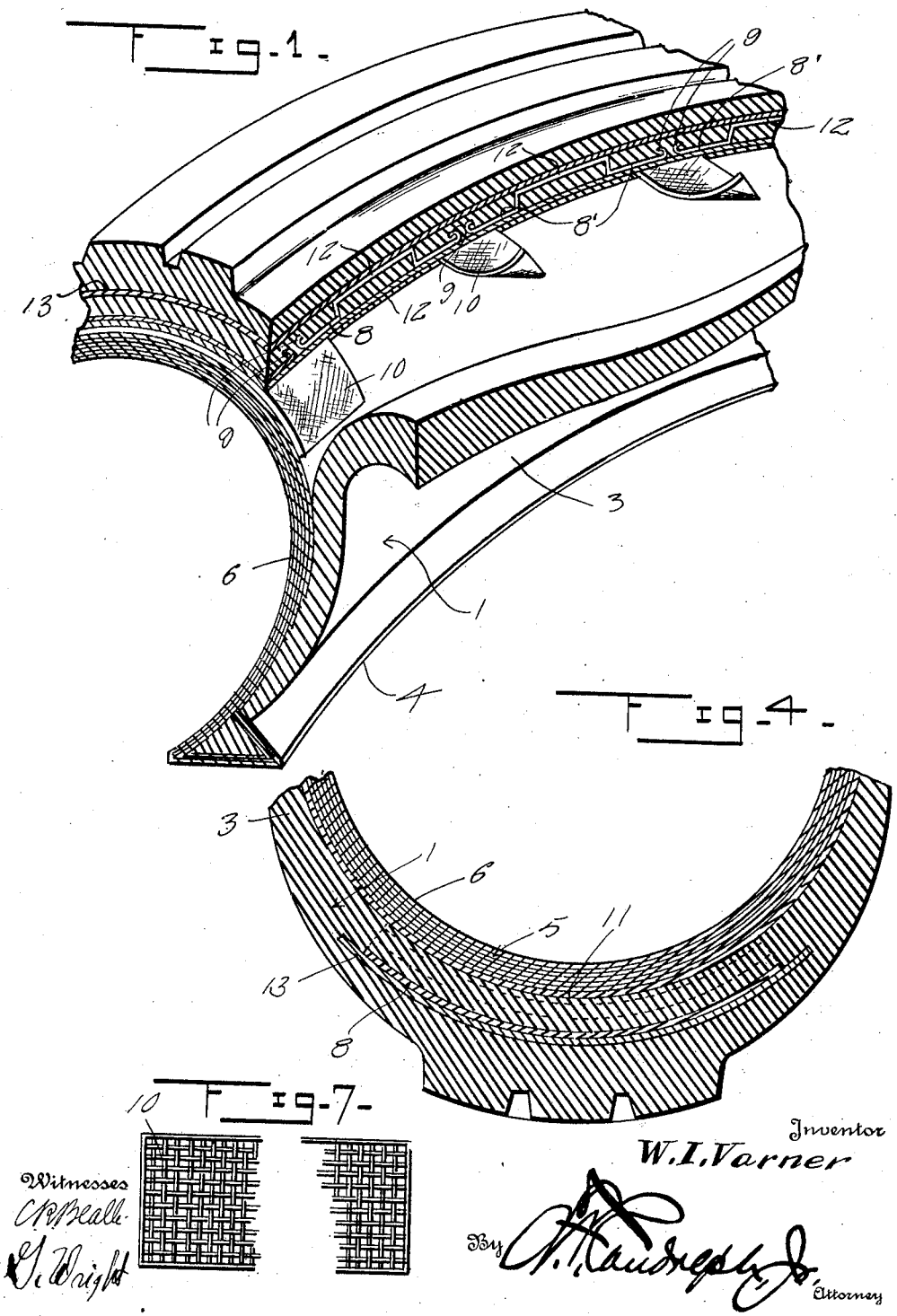

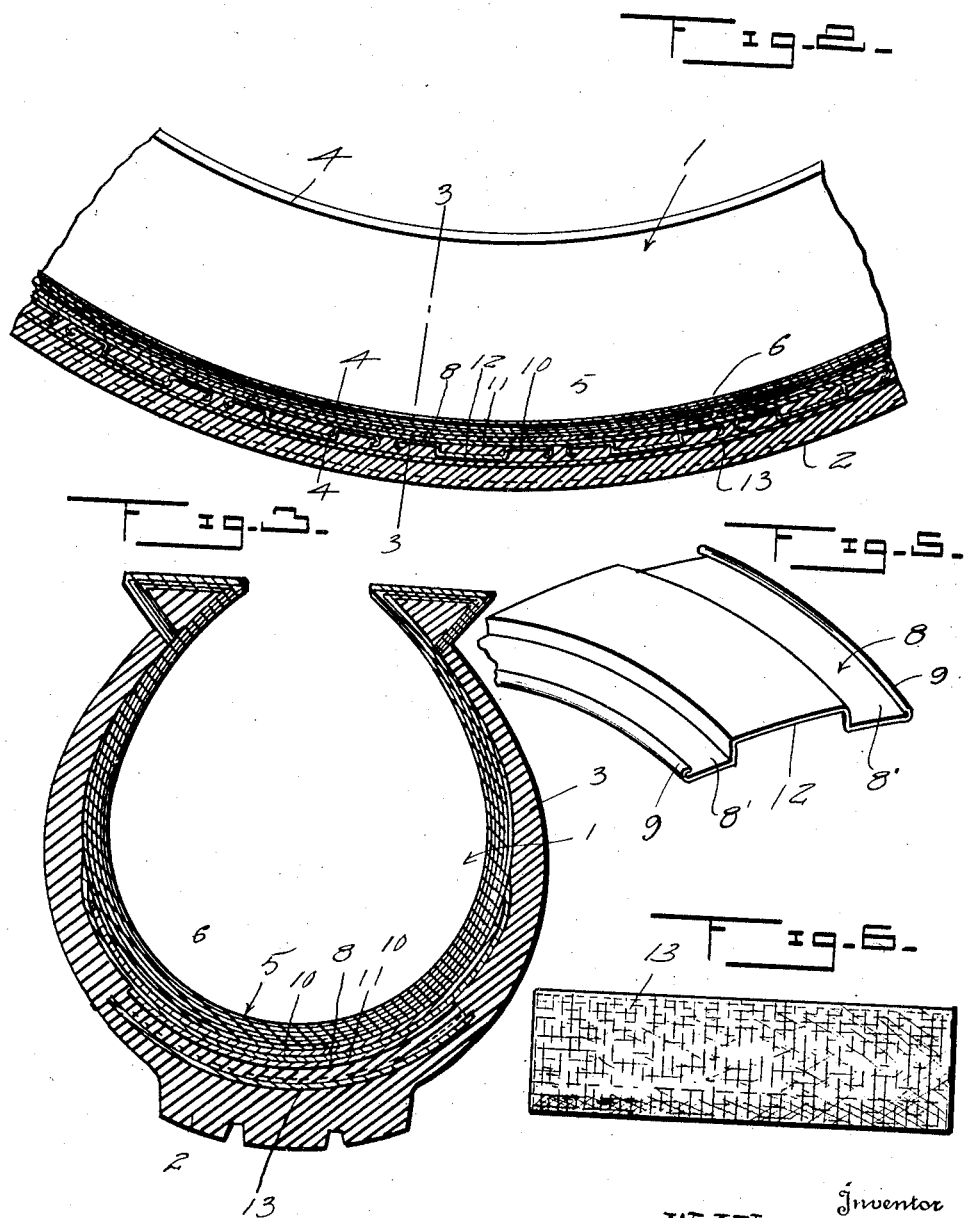

WILLIAM I. VARNER, OF ATHENS, GEORGIA.

AUTOMOBILE-TIRE.

1,327,503.  Specification of Letters Patent.  Patented Jan. 6, 1920.

Application filed January 26, 1918. Serial No. 213,937.

*To all whom it may concern:*

Be it known that I, WILLIAM I. VARNER, a citizen of the United States, residing at Athens, in the county of Clarke and State of Georgia, have invented certain new and useful Improvements in Automobile-Tires; and I do hereby declare the following to be a full, clear, and exact description of the invention, such as will enable others skilled in the art to which it appertains to make and use the same.

This invention relates to pneumatic tires for automobiles and the like, and the primary object of the invention is to provide a practical tire casing which is so formed that the likelihood of the inner tube being punctured by foreign objects is reduced to a minimum.

Another object of the invention is the provision of a plurality of transversely extending metallic plates embedded in the casing, the plates being so arranged as to not impair the elastic qualities of the tire.

A further object of the invention is the provision of a plurality of metallic plates embedded in the tire casing having wire cloth fabric positioned beneath the meeting edges of the metallic plates, the plates being bent so as to form anchoring members to prevent the displacement of the same.

A still further object of the invention is the provision of a practical tire casing of the above character, which is durable and efficient in use, one that is simple and easy to manufacture, and one that can be placed upon the market at a reasonable price.

With these and other objects in view, the invention consists in the novel construction, arrangement and formation of parts as will be hereinafter more specifically described, claimed and illustrated in the accompanying drawings, forming a part thereof, in which:—

Figure 1 is a detail fragmentary perspective view of the improved tire casing showing the same partly in section with the rubber turned back to expose to view the plates and the wire fabric.

Fig. 2 is a fragmentary vertical longitudinal section through the improved tire casing.

Fig. 3 is a cross sectional view taken on the line 3—3 of Fig. 2.

Fig. 4 is a detail sectional view taken on the line 4—4 of Fig. 2.

Fig. 5 is a detail perspective view of one of the metallic plates.

Fig. 6 is a detail view of the fabric cloth used for encircling the metallic plates, and Fig. 7 is a detail plan view of the wire fabric which is positioned beneath the meeting edges of the metallic plates.

Referring to the drawings in detail, wherein similar reference numerals designate corresponding parts, throughout the several views, the numeral 1 generally indicates the improved tire casing which includes the tread 2 and the side walls 3, which have their edges formed with the beads 4. The body or carcass 5 of the tire casing is formed of a plurality, preferably six or more, of superimposed layers of fabric cloth 6, which extend circumferentially around the tire and are vulcanized together with a rubber portion, as is usual in the tire casing construction. Embedded in the tread of the tire around the outer surface of the fabric layers are a plurality of metallic plates 8 which extend transversely across the tire and are curved to conform to the curvature of the tire casing. These plates have their longitudinal edges rolled as at 9 and positioned beneath the opposed edges of the plates so as to bridge the space between the same and directly above the fabric layers 6 are strips of wire fabric 10, and these strips are so positioned as to prevent the sharp objects from puncturing the tire between the plates. The wire fabric extends transversely across the tread and is of sufficient length to protect the entire width of the tread surface. A strip of fabric cloth 11 is positioned between the metallic plates 8 and the wire mesh 10. The metallic plates 8 are each provided with a longitudinally extending raised central body portion 12 which forms means for anchoring the plates in the tire and prevents displacement of the same. Directly above the plates 8 a strip of fabric cloth 13 is drawn circumferentially around the tire and this strip forms additional means for holding the plates in position. After the last layer of fabric cloth 13 is placed in position, the tread 2 is molded on the tire.

From the foregoing description it can be seen that an improved practical tire casing is provided which prevents puncturing of the inner tube and one in which the elasticity of the tire is not impaired.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

A tire having a plurality of relatively spaced transversely extending fabric strips embedded therein in contact with its carcass, a circumferentially extending fabric strip embedded in the tire and engaging the outer side of said transversely extending strips, a plurality of plates embedded in the tire and engaging the outer side of said circumferentially extending strip and having its ends relatively spaced and overlapping said transversely extending strips, the plates having their ends rolled and embedded in the tread of the tire and having their central portions offset and embedded in the tread, and a fabric strip embedded in the tread in contact with the outer sides of said offset portions.

In testimony whereof I affix my signature in presence of two witnesses.

WILLIAM I. VARNER.

Witnesses:
 F. H. KAPPA,
 W. B. MUNNELL.